United States Patent [19]

Wikelski et al.

[11] 4,229,011
[45] Oct. 21, 1980

[54] LUBRICATION SYSTEM FOR RECIPROCATING PLUNGER COMPRESSORS

[75] Inventors: Karl W. Wikelski; Henry K. Tyson, both of Odessa, Tex.

[73] Assignee: El Paso Polyolefins Company, Paramus, N.J.

[21] Appl. No.: 54,543

[22] Filed: Jul. 3, 1979

Related U.S. Application Data

[63] Continuation of Ser. No. 671,872, Mar. 29, 1976, abandoned.

[51] Int. Cl.³ .......................... F16J 15/40; F16J 15/46
[52] U.S. Cl. ................................ 277/72 FM; 277/28; 277/75; 277/193; 91/46; 92/156
[58] Field of Search ................. 91/46; 92/156; 277/3, 277/28, 72, 74, 75, 193, 76, 59, 72 R, 72 FM, 124, 125, 70, 73

[56] References Cited

U.S. PATENT DOCUMENTS

| | | | |
|---|---|---|---|
| 1,844,903 | 2/1932 | Queen | 277/72 FM X |
| 2,321,927 | 6/1943 | McCoy et al. | 277/70 X |
| 2,323,179 | 6/1943 | Hall et al. | 277/19 |
| 2,410,291 | 10/1946 | Kinzbach | 277/72 FM X |
| 2,411,020 | 11/1946 | Blasutta | 92/156 X |
| 2,731,282 | 1/1956 | McManus et al. | 277/72 FM X |
| 3,019,739 | 2/1962 | Prosser | 277/124 X |
| 3,047,299 | 7/1962 | Karsten | 277/74 X |
| 3,540,741 | 11/1970 | LeFebvre | 277/28 |
| 3,544,118 | 12/1970 | Klein | 277/75 X |
| 3,834,715 | 9/1974 | Butler | 277/74 X |

FOREIGN PATENT DOCUMENTS

| | | | |
|---|---|---|---|
| 681538 | 2/1930 | France | 277/73 |
| 1058192 | 2/1967 | United Kingdom | 277/59 |

Primary Examiner—Robert S. Ward, Jr.
Attorney, Agent, or Firm—Fred S. Valles; Margareta LeMaire

[57] ABSTRACT

An improved lubrication system is provided for the cylinder of a reciprocatory plunger rod compressor, having a stationary annular seal assembly around said plunger rod. The key feature of this system resides in the incorporation of check valves in lubricant supply passages located internally within the seal assembly surrounding the plunger rod. Preferably, said check valves are located within suitable recesses bored into the rear face of an interior packing cup element of said seal assembly. The use of such internal lubricant check valves protects the lubricator quills, fittings, and other components of the lubrication system against fatigue failures and lengthens the continuous on-line operating life of the entire lubrication system.

10 Claims, 5 Drawing Figures

LUBRICATION SYSTEM FOR RECIPROCATING PLUNGER COMPRESSORS

This is a continuation of application Ser. No. 671,872, filed Mar. 29, 1976, now abandoned.

BACKGROUND OF THE INVENTION

This invention relates to improvements in lubricated compressor cylinders of the reciprocating plunger type. More particularly, it is directed to an improved lubrication system for such compressor cylinders involving modified packing cup elements especially adapted for use in the annular seal assemblies thereof.

Reciprocating compressors have been developed extensively in order to provide various commercial operations, e.g. polyethylene manufacturing, with feed streams at the elevated pressures required, e.g. around 1000 atmospheres and above. In order to achieve commercially practical performance, much effort has been applied towards minimizing two basic engineering problems which are virtually inherent in reciprocal hyper-compression, namely (1) fatigue failures in components subject to cyclic pressure fluctuations and (2) maintenance difficulties with high pressure seals, particularly around the periphery of the reciprocating plunger rod.

In order to provide adequate and serviceable sealing around the periphery of the plunger, it has been common practice to employ an axial series of close-fitting annular packing cups with inner peripheral recesses therein in which are carried specially shaped and fitted seal rings. The assembled series of packing cups is rigidly mounted to provide a cylindrical bore surrounding the plunger rod with the seal rings bearing against the periphery thereof. In order to reduce frictional effects and wear, a lubricating liquid is normally fed to the periphery of said plunger at one or more locations, e.g. as shown in U.S. Pat. No. 3,490,774 to Henry et al.

Many different approaches have been applied in dealing with the aforementioned fatigue problems, including the use of autofrettage treatments, shrink fit constructions and similar methods of insuring that critical parts are maintained in compression throughout the working cycle. For example, FIG. 1 of the above mentioned U.S. Pat. No. 3,490,774 depicts a seal assembly in which most of the packing cups (i.e. 40-46) are of the familiar compound construction comprising an inner (a) ring onto which an outer (b) ring is shrink-fitted.

An alternative approach which has found commercial utility in this field is to subject the outer periphery of the seal assembly to the actual working fluid of the compressor at substantially full discharge pressure as disclosed in U.S. Pat. No. 3,128,941 to Waibel. As depicted in FIG. 4 of said patent, this so-called "pressure-wrapped" seal assembly design permits the use of simpler, unitary packing cups which are automatically maintained largely under compressive stress by the working fluid during the actual operation of the compressor.

Through the adoption of such special measures, the susceptibility of the packing cups in reciprocating compressors to suffer fatigue failures has been greatly alleviated in recent years. However, difficulty is still being experienced in translating these gains in packing cup fatigue resistance into extended on-line uninterrupted compressor service because of fatigue failures occuring in certain associated components of the compressor which necessitate shut downs for repairs. Notable among the auxiliary components showing greatest vulnerability in this respect are the bottom end spacer at the crank end of the compressor cylinder and the lubricant feed quills, check valves and other elements of the lubricating system.

The primary object of the present invention is to improve the reliability and service life of the lubrication system for a reciprocating compressor. A closely allied object is to integrate the lubricating system into the annular seal assembly of a reciprocating plunger compressor to form a more durable and efficient overall machine, thus providing extended on-line service life for the entire compressor.

Still other objects and related advantages of the present invention will become apparent from the following detailed description thereof.

DETAILED DESCRIPTION

The above objects have been achieved and the average continuous operating period between shutdowns for a high pressure reciprocating compressor has been greatly extended in accordance with the present invention by incorporating internal check valves in one or more of the packing cups therein having passageways therethrough for the transmission of lubricating fluid.

A full understanding of the present invention and the detailed construction involved in concrete embodiments thereof can be readily obtained from the following description and accompanying drawings wherein.

Figure 1:
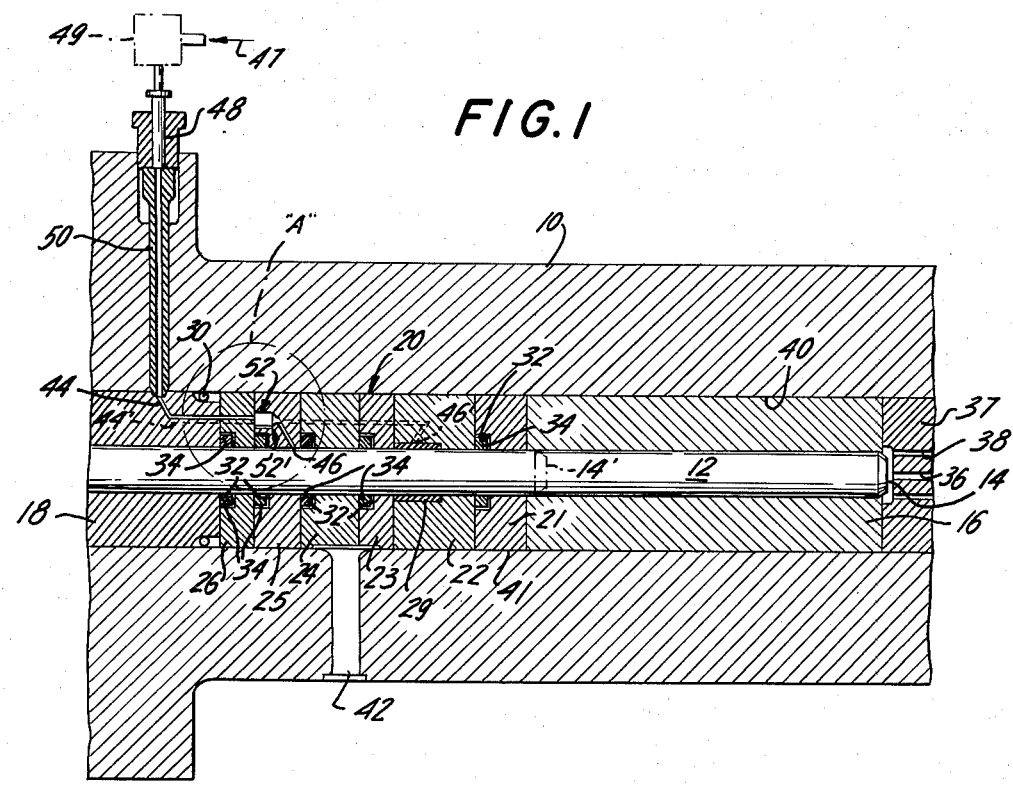
FIG. 1 is a longitudinal sectional view through a portion of the main housing of a reciprocating compressor cylinder showing the working portion of the plunger unsectioned, and most remaining parts in section, such as the "pressure-wrapped" seal assembly surrounding the plunger and the lubrication system incorporated therein in accordance with the present invention.

In FIG. 1, there is depicted a portion of the main housing 10 of a reciprocating compressor cylinder equipped internally with a plunger rod 12, the head end of which is shown both in the position 14 representing the end of a discharge stroke, as well as at the end of a suction stroke (by dotted lines) 14'. The plunger rod 12 is, of course, driven in conventional manner by means of an external crank mechanism (not shown) connected to its rear end (cutaway in FIG. 1). The compression chamber in which said plunger rod 12 acts is formed by an axially aligned series of annular elements, i.e. head end sleeve member 16, bottom end spacer 18 and mounted therebetween the annular seal assembly 20 (which in turn comprises a series of packing cups carrying appropriate seal rings at their inner periphery). In the embodiment depicted in FIG. 1, the annular seal assembly 20 is composed of six separate packing cups 21, 22, 23, 24, 25 and 26 in closely abutting parallel sequence. Packing cup 22 is fitted at its inner periphery with wear ring 29, while the other packing cups 21, 23, 24, 25 and 26 are provided with peripheral recesses 32 in their back faces in which are mounted seal rings 34 which in compression bear against the outer periphery of plunger rod 12 and front faces of adjacent cups in order to prevent leakage of compressed fluid around same.

The working fluid enters the compression chamber through intake passage 36 by means of a conventional high pressure valve (not shown). During the compression stroke, said valve closes forcing the compressed fluid to exit through annular space 38 which connects by internal passageways (not shown) with peripheral passageways 40 around the outside of head end sleeve member 16. This, in turn, supplies full working fluid pressure to the space 41 surrounding annular seal assembly 20 as the compressed fluid is being delivered through discharge port 42. The compressor valve and manifold assembly 37 is held in place at the front end of the compressor by means of a cylinder head (not shown) which is attached with appropriate seals to the cylinder housing 10 at the front end (cut away in FIG. 1). A static seal assembly 30 is provided around the outer periphery of bottom end spacer 18. Lubricating fluid supply is provided through bottom end spacer 18 via internal passageways 44 and 44' which communicate with similar internal passageways through packing cups within seal assembly 20 to deliver lubricant to points 46 and 46' at the outer periphery of plunger rod 12. The lubricating system includes conventional elements such as a high pressure pump (not shown) feeding in direction 47 to high pressure fitting 48 attached to the outside of main cylinder housing 10 and thence through a lubricator quill 50 into bottom end spacer 18. It may also include external check valve 49 immediately upstream of fitting 48 but definitely includes at least one check valve located internally within seal assembly 20, for example, ball check valves 52 and 52' in packing cup 25.

Figure 1A:
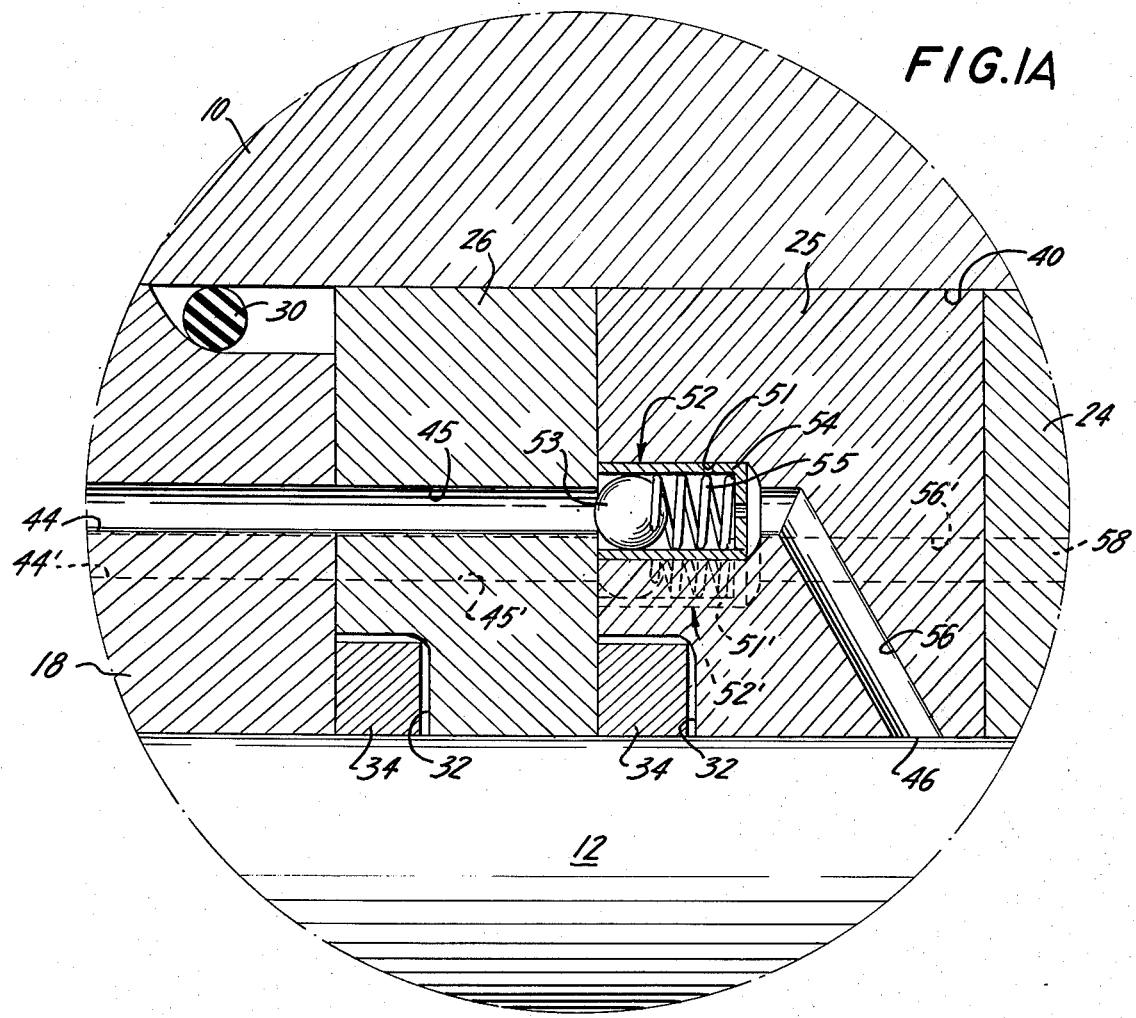
FIG. 1A is an enlargement of the portion of FIG. 1 generally enclosed within circle "A" on FIG. 1 and including the principal packing cup which incorporates the key feature of the present invention.
Figure 3:
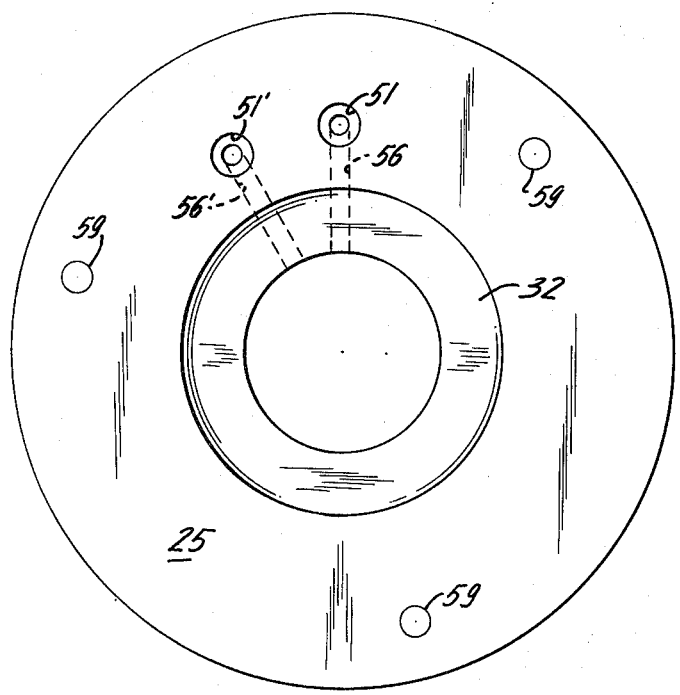
FIG. 3 is an end view of the "crank-end" of the packing cup of FIG. 2.
Figure 2:
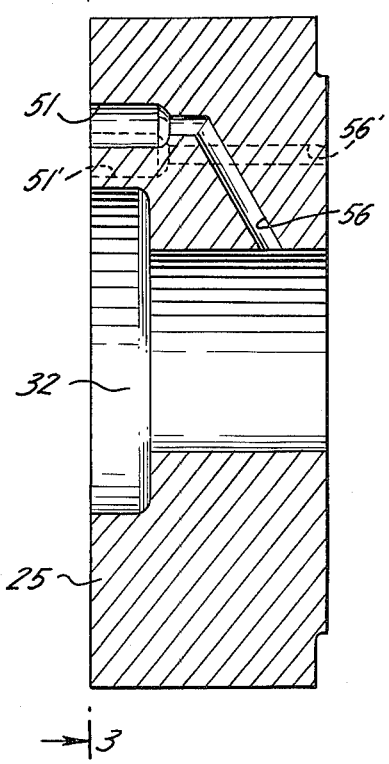
FIG. 2 is a full longitudinal sectional view of the same packing cup on approximately half the scale of FIG. 1A.

The detailed construction of this key feature of the present invention can best be explained by considering the larger scale drawings of FIGS. 1A, 2 and 3. Thus, in FIG. 1A, passageways 44 and 44' will be seen to communicate directly with internal passages 45 and 45' respectively through packing cup 26. The face of packing cup 25 which is immediately adjacent to cup 26 contains enlarged recessed bores 51 and 51' which are in concentric axial alignment with passages 45 and 45' respectively. Within these recessed bores are located the conventional parts of a ball check valve, namely the movable closure ball 53, the compressibly biasing spring 55 and the spring guide retainer 54. Leading from the bottom of bores 51 and 51' are suitable internal passages 56 and 56' respectively in cup 25. Passage 56 leads to point 46 while passage 56' leads to communicating passage 58 through cup 24.

The relative location of bores 51 and 51' can be better seen from FIGS. 2 and 3, the latter of which also shows the location of holes 59 which are adapted to receive alignment roll pins or bolts, which may be used in assembling the various parts including the seal assembly of the compressor.

It will be obvious that certain optional variations of the above described embodiment are encompassed within the present invention. For example, based upon factors such as plunger rod size, service conditions and materials of construction employed only one lubricant delivery point might be employed, in which case only one internal check valve would be necessary within the seal assembly. Also, when two or more internal check valves are employed, more than one packing cup can be modified with suitable bores therefor. For example, instead of equipping cup 25 in the above described embodiment with both bores 51 and 51', one of these could have been located in packing cup 24. It should also be apparent that a lubricant delivery system equipped with an internal check valve located in one of the packing cups of the seal assembly in accordance with this invention can be operated with or without external check valves such as valve 49, in the lubricant feed system, although in the interest of economy such valves could be eliminated as unnecessary. Likewise, poppet or other types of check valves can be used in place of the ball-type valves shown.

Figure 4:
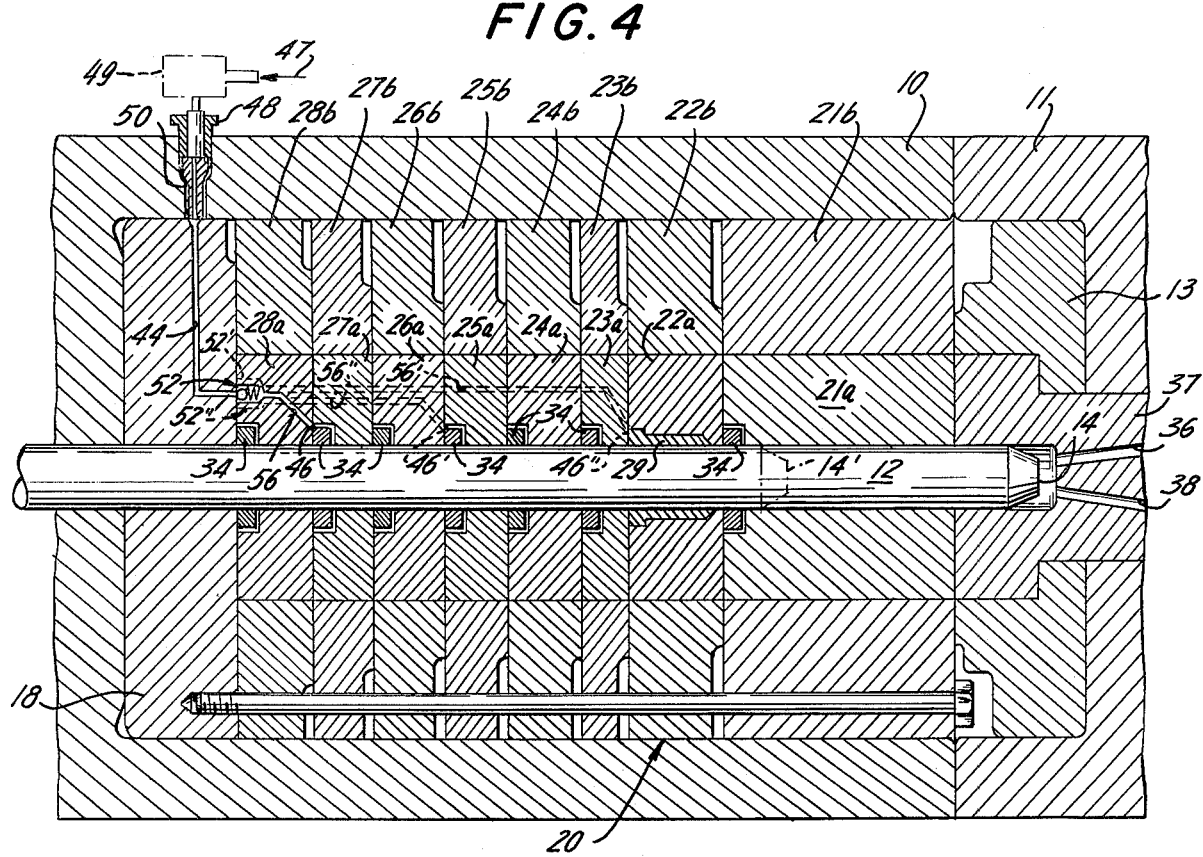
FIG. 4 is a longitudinal, partly sectional and somewhat diagrammatical view of another compressor cylinder wherein the packing cups are of the compound design and the lubrication system encompasses three separate lubricant delivery points instead of two as in FIG. 1.

Turning now to FIG. 4, many of the basic elements of this compressor cylinder and the reference numerals used thereon will be seen to correspond closely with FIG. 1. However, the seal assembly 20 of FIG. 4 comprises eight compound packing cups consisting of inner rings 21a, 22a, 23a, 24a, 25a, 26a, 27a, and 28a with shrunk fit outer rings 21b, 22b, 23b, 24b, 25b, 26b, 27b and 28b respectively. The compressor valve block 37 is mounted by means of cylinder head 11 and spacer ring 13 but the actual valves which supply working fluid through intake passage 36 and withdraw same through discharge passage 38 are not shown. Also, three lubricant delivery points 46, 46' and 46" are provided at the periphery of plunger rod 12, supplied via passageways 56, 56' and 56" respectively from internal check valves 52, 52' and 52" located in packing cup element 28a. The additional lubricant quills and lubricant feed passages leading to check valves 52' and 52" are not visible in FIG. 4 but are of course equivalent to 50 and 44 as shown. Also, as previously indicated the use of external check valves such as valve 49 in the lubricant feed supply system is optional in connection with the present invention.

TEST RESULTS

The lubricating system components of a hypercompressor incorporating the design shown in FIG. 1 hereof have exhibited no tendency toward fatigue failures in test involving substantially continuous operation for periods of 9 to 18 months at pressures of over 1000 atmospheres. In contrast thereto, under the same conditions of service, the same compressor, except that conventional packing cups lacking any internal check valve were used throughout the annular seal assembly 20, had to be shut down for service on an average frequency of about once per month because of fatigue failures in either bottom end spacer 18, lubricating quills 50 or various parts of external check valves 49.

Furthermore, the lubrication system as shown in FIG. 1 has operated more reliably and efficiently as shown by reduced wear of plunger rod 12 and seal rings 34 and increased life of the entire annular seal assembly 20.

Having disclosed completely our invention together with several specific embodiments thereof, it is to be understood that all modifications and variations thereof which are obvious to those skilled in the art are to be included within the spirit of scope of the invention as defined by the appended claims.

What is claimed is:

1. An assembly for compressing an operating fluid to a high pressure comprising a reciprocatory plunger rod compressor cylinder lubricated with a fluid other than the operating fluid; an attendant plunger rod; a crank mechanism connected to one end of the plunger rod for imparting thereto a reciprocatory motion of alternating suction and discharge strokes; laterally surrounding said plunger rod an annular seal assembly which includes a plurality of closely abutting continuous annular seal elements the inner peripheries of which lie immediately adjacent the outer periphery of said plunger rod and at least one of which annular seal elements contains a bored, lubricant-supply passageway running internally through the solid body of same; upstream of said seal element and in communication with said passageway a lubricant supply source; a two-part pressure-actuated check valve located in the lubricant supply passageway of said annular seal element for permitting flow of lubricant from the supply source during a suction stroke of the plunger rod, and which check valve is non-responsive to the ambient pressure outside the compressor assembly.

2. The improvement of claim 1 wherein said check valve is located in a portion of said passageway extending substantially longitudinally through said seal element in relation to the plunger rod.

3. The improvement of claim 2 in which said seal elements comprise a plurality of closely abutting annular packing cups and said check valve is located in an enlarged bore in the rear face of one of said packing cups comprising part of said passageway.

4. The improvement of claim 3 in which said check valve comprises spring biased movable ball or poppet closure element.

5. The improvement of claim 3 in which said seal elements comprise at least three annular packing cups.

6. The improvement of claim 5 in which said seal elements comprise more than three annular packing cups and the packing cup in which said check valve is located is one nearer the rear end of the compressor cylinder.

7. An improved oacking cup for incorporation in a pressure wrapped seal assembly of a lubricated plunger rod reciprocatory compressor cylinder comprising a continuous annular ring having inner and outer peripheral surfaces and substantially radially extending faces at either end, an inner peripheral recess in at least one of said radially extending faces for receiving a sealing ring, at least one longitudinal passage extending through at least a portion of said cup in a generally axial direction at a radial distance beyond said recess and an enlarged bore in one of said radially extending faces communicating substantially concentrically with said lubricant passage and adapted to house a two-port fluid check valve assembly.

8. The packing cup of claim 7 wherein said recess and said bore are located in the same face thereof.

9. The packing cup of claim 7 wherein there is provided a plurality of said lubricant passageways extending at least part way through said cup.

10. The packing cup of claim 9 wherein at least two such lubricant passageways each communicates substantially concentrically with a separate such enlarged bore.

* * * * *

UNITED STATES PATENT AND TRADEMARK OFFICE
CERTIFICATE OF CORRECTION

PATENT NO. : 4,229,011

DATED : October 21, 1980

INVENTOR(S) : Karl W. Wikelski and Henry K. Tyson

It is certified that error appears in the above-identified patent and that said Letters Patent are hereby corrected as shown below:

Column 5, line 17        "two-part" should read

--two-port--

Signed and Sealed this

Third Day of February 1981

[SEAL]

Attest:

RENE D. TEGTMEYER

Attesting Officer      Acting Commissioner of Patents and Trademarks